J. Adams,
Wash-Board,
No 22,053.    Patented Nov. 16, 1858.
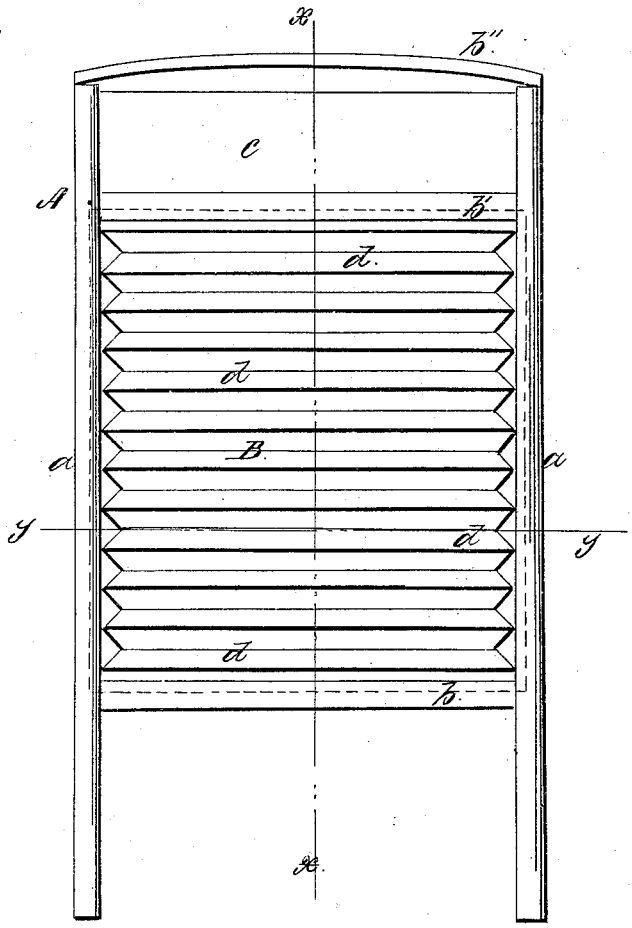
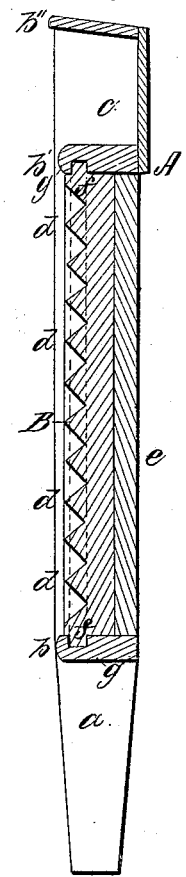
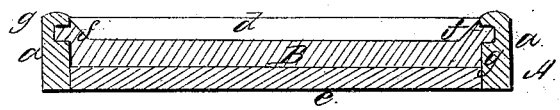
N. PETERS, PHOTO-LITHOGRAPHER, WASHINGTON, D.C.

UNITED STATES PATENT OFFICE.

JNO. ADAMS, OF PITTSBURG, PENNSYLVANIA.

WASHBOARD.

Specification of Letters Patent No. 22,053, dated November 16, 1858.

*To all whom it may concern:*

Be it known that I, JOHN ADAMS, of Pittsburg, in the county of Allegheny and State of Pennsylvania, have invented a new and useful Improvement in the Construction of Washboards; and I do hereby declare that the following is a full, clear, and exact description of the same, reference being had to the annexed drawings, making a part of this specification, in which—

Figure 1, is a face view of a washboard constructed according to my invention. Fig. 2, is a longitudinal section of ditto, $x$, $x$, Fig. 1, indicating the plane of section. Fig. 3, is a transverse section of ditto, taken in the line $y$, $y$, Fig. 1.

Similar letters of reference indicate corresponding parts in the several figures.

This invention consists in having the rubber of the wash-board constructed of glass and fitted in a wooden frame as hereinafter shown.

To enable those skilled in the art to fully understand and construct my invention I will proceed to describe it.

A, represents a wooden frame which is constructed similarly to the frames of the ordinary wash-boards, $a$, $a$, being two side pieces, $b$, $b'$, $b''$, cross pieces at their upper and lower parts and $c$, a box or receptacle for soap.

B, is the rubber or corrugated portion against which the clothes are rubbed. This rubber is constructed of glass, and is pressed in a mold of proper form. The corrugations may be angular projections $d$, as shown in Fig. 2, the corrugations extending transversely across the rubber as shown clearly in Fig. 1.

The side pieces $a$, $a$, of the frame A, are of sufficient depth to allow a rubber of requisite thickness to be fitted between them and also allow a wooden back $e$, to be fitted between them, see Figs. 2 and 3, said back serving to protect the rubber.

The rubber has a cleat or projection $f$, formed on each edge or side of it, and these cleats or projections fit in grooves $g$, made in the inner surfaces of the side pieces and cross pieces $b$, $b'$, see Figs. 2 and 3. These cleats retain or secure the rubber firmly in the frame A.

The wash-board may be made of the usual size.

The advantages attending the board thus constructed are, that the rubber is non-corrosive, it is very durable, not at all subject to wear, presents a hard surface rendering the operation of washing less laborious than usual. It is not liable to break and may be constructed at a reasonable cost.

Having thus described my invention what I claim as new and desire to secure by Letters Patent, is:

An improved article of manufacture. A wash board, having its rubber B, composed of glass, as and for the purposes herein shown and described.

JOHN ADAMS.

Witnesses:
    W. F. WALKER,
    SAMUEL CHARTERS.